United States Patent Office.

LUCY J. BUTTRILL, OF JACKSON, GEORGIA.

Letters Patent No. 105,168, dated July 12, 1870.

IMPROVED MEDICAL COMPOUND.

The Schedule referred to in these Letters Patent and making part of the same.

*To all whom it may concern:*

Be it known that I, Mrs. LUCY J. BUTTRILL, of Jackson, in the county of Butts and State of Georgia, have invented a new and useful Improvement in Anodyne Cough-Sirup; and I do hereby declare that the following is a full, clear, and exact description thereof, which will enable others skilled in the art to make and use the same.

My invention has for its object to furnish a simple, reliable, and efficacious medicine for the cure of coughs, colds, bronchitis, affections of the throat, croup, asthma, consumption, chronic affections of the lungs, and all pulmonary diseases; and It consists in the sirup composed of the ingredients, and prepared in the manner substantially as hereinafter described, and for the purposes set forth.

In preparing this medicine, I take one quart of a strong tea made of button-bush or elbow-root, botanically known as *cephalanthus*, (of the madder family,) one-half pint of a strong tea made of the root of elecampane, and one-half pint of a strong tea made of the root of comfrey, mix them together, and add one quart of strained honey. The mixture is then simmered over a slow fire until reduced to one-half the original quantity. When cold, I add, for each quart of the sirup, one dram of saltpeter, and one ounce of paregoric, and stir until thoroughly mixed. The sirup is then ready for use, or to be bottled for market.

Having thus described my invention,

I claim as new and desire to secure by Letters Patent—

An improved anodyne cough-sirup, compounded of the ingredients, and prepared in the manner, substantially as herein described, and for the purposes set forth.

MRS. LUCY J. BUTTRILL.

Witnesses:
 LARKIN D. WATSON,
 ISAAC SLAUGHTER.